US009934323B2

(12) United States Patent
Presta et al.

(10) Patent No.: US 9,934,323 B2
(45) Date of Patent: Apr. 3, 2018

(54) SYSTEMS AND METHODS FOR DYNAMIC MAPPING FOR LOCALITY AND BALANCE

(71) Applicant: Facebook, Inc., Menlo Park, CA (US)

(72) Inventors: Alessandro Presta, San Francisco, CA (US); Alon Michael Shalita, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 314 days.

(21) Appl. No.: 14/043,730

(22) Filed: Oct. 1, 2013

(65) Prior Publication Data

US 2015/0095348 A1    Apr. 2, 2015

(51) Int. Cl.
    G06F 7/00      (2006.01)
    G06F 17/30     (2006.01)
    G06Q 50/00     (2012.01)
    G06Q 10/10     (2012.01)

(52) U.S. Cl.
    CPC ..... *G06F 17/30958* (2013.01); *G06Q 10/101* (2013.01); *G06Q 50/01* (2013.01)

(58) Field of Classification Search
    None
    See application file for complete search history.

(56) References Cited

U.S. PATENT DOCUMENTS

| 5,835,085 | A | * | 11/1998 | Eick | H04M 3/2254 345/440 |
| 5,970,495 | A | * | 10/1999 | Baru | G06F 9/5088 |
| 6,437,804 | B1 | * | 8/2002 | Ibe et al. | 715/736 |
| 8,065,090 | B2 | | 11/2011 | Fitch et al. | |
| 8,539,197 | B1 | * | 9/2013 | Marshall | G06F 13/00 711/112 |
| 9,083,757 | B2 | * | 7/2015 | Zhang | H04L 41/145 |
| 2006/0015588 | A1 | * | 1/2006 | Achlioptas et al. | 709/220 |
| 2006/0150168 | A1 | | 7/2006 | Mitchell et al. | |
| 2007/0016898 | A1 | | 1/2007 | Derby et al. | |
| 2007/0239694 | A1 | | 10/2007 | Singh et al. | |
| 2008/0189093 | A1 | * | 8/2008 | Fitch et al. | 703/11 |
| 2010/0313205 | A1 | * | 12/2010 | Shao | 718/105 |
| 2010/0332476 | A1 | * | 12/2010 | Buehrer et al. | 707/737 |

(Continued)

OTHER PUBLICATIONS

Ugander, Johan et al., "Balanced Label Propagation for Partitioning Massive Graphs," Proceedings of the Sixth ACM International Conference on Web Search and Data Mining (WSDM '13), pp. 507-516, Feb. 4, 2013.

(Continued)

*Primary Examiner* — David T Brooks
(74) *Attorney, Agent, or Firm* — Sheppard Mullin Richter & Hampton LLP

(57) ABSTRACT

To dynamically map nodes for locality and balance, computer implemented methods, systems, and computer readable media, in an embodiment, may compute histograms for nodes in a first partition. Histograms may be computed for nodes in a second partition. The second partition may be selected as a candidate partition for a set of nodes in the first partition based on the histograms for the nodes in the first partition. The first partition may be selected as a candidate partition for a set of nodes in the second partition based on the histograms for the nodes in the second partition. At least a portion of the set of nodes in the first partition may be mapped to the second partition and at least a portion of the set of nodes in the second partition may be mapped to the first partition based on load balancing.

17 Claims, 7 Drawing Sheets

(56) References Cited

U.S. PATENT DOCUMENTS

| | | | |
|---|---|---|---|
| 2011/0029887 A1* | 2/2011 | Pearson | G06Q 10/10 715/743 |
| 2011/0208824 A1* | 8/2011 | Lidstrom | H04W 48/18 709/206 |
| 2011/0212783 A1* | 9/2011 | Dale | H04L 67/1002 463/42 |
| 2011/0276649 A1* | 11/2011 | Pujol | G06Q 10/10 709/208 |
| 2012/0158858 A1* | 6/2012 | Gkantsidis | H04L 51/22 709/206 |
| 2012/0197834 A1* | 8/2012 | Panigrahy | G06N 5/048 706/52 |
| 2012/0310959 A1 | 12/2012 | Huhn | |
| 2013/0073552 A1* | 3/2013 | Rangwala et al. | 707/737 |
| 2013/0108263 A1* | 5/2013 | Srinivas et al. | 398/45 |
| 2013/0124809 A1* | 5/2013 | DeJana | G06F 17/30492 711/165 |
| 2013/0151683 A1* | 6/2013 | Jain | G06F 3/0611 709/223 |
| 2014/0114950 A1* | 4/2014 | Halverson et al. | 707/713 |
| 2014/0149418 A1* | 5/2014 | Qin | G06Q 10/00 707/740 |
| 2014/0244335 A1* | 8/2014 | Baldwin | G06Q 10/06311 705/7.17 |
| 2014/0320497 A1* | 10/2014 | Vojnovic | G06T 11/206 345/440 |

OTHER PUBLICATIONS

International Application No. PCT/US2013/071087, International Search Report and Written Opinion dated Jul. 7, 2014.
European Patent Application No. 13193398.8, Search Report dated May 4, 2015.
European Patent Application No. 13193398.8, Examination Report dated Dec. 12, 2016.

* cited by examiner

SYSTEMS AND METHODS FOR DYNAMIC MAPPING FOR LOCALITY AND BALANCE

FIELD OF THE INVENTION

The present invention relates to the field of node graphs. More particularly, the present invention provides techniques for mapping nodes to partitions.

BACKGROUND

Social networking websites provide a dynamic environment in which members can connect to and communicate with other members. These websites may commonly provide online mechanisms allowing members to interact within their preexisting social networks, as well as create new social networks. Members may include any individual or entity, such as an organization or business. Among other attributes, social networking websites allow members to effectively and efficiently communicate relevant information to their social networks.

A member of a social network may highlight or share information, news stories, relationship activities, music, video, and any other content of interest to areas of the website dedicated to the member or otherwise made available for such content. Other members of the social network may access the shared content by browsing member profiles or performing dedicated searches. Upon access to and consideration of the content, the other members may react by taking one or more responsive actions, such as providing feedback or an opinion about the content. The ability of members to interact in this manner fosters communications among them and helps to realize the goals of social networking websites.

A social network may be modeled as a social graph. Node graphs, such as social graphs, may include an extremely large number of nodes and edges connecting the nodes. In the case of a social networking system, users are able to access and share vast amounts of information reflected in the node graph. The number of nodes, for example, may be in the hundreds of millions or even billions. The maintenance and provision of such vast amounts of data present many challenges.

SUMMARY

To dynamically map nodes for locality and balance, computer implemented methods, systems, and computer readable media, in an embodiment, may compute histograms for nodes in a first partition. Histograms may be computed for nodes in a second partition. The second partition may be selected as a candidate partition for a set of nodes in the first partition based on the histograms for the nodes in the first partition. The first partition may be selected as a candidate partition for a set of nodes in the second partition based on the histograms for the nodes in the second partition. At least a portion of the set of nodes in the first partition may be mapped to the second partition and at least a portion of the set of nodes in the second partition may be mapped to the first partition based on load balancing.

In an embodiment, histograms may be computed for nodes in a third partition. The third partition may be selected as a candidate partition for another set of nodes in the first partition based on the histograms for the nodes in the first partition. The first partition may be selected as a candidate partition for a set of nodes in the third based on the histograms for the nodes in the third partition. At least a portion of the other set of nodes in the first partition may be mapped to the third partition and at least a portion of the set of nodes in the third partition may be mapped to the first partition based on load balancing.

In an embodiment, the set of nodes in the first partition may be sorted based on a gain in edge locality. The set of nodes in the second partition may be sorted based on a gain in edge locality.

In an embodiment, the second partition may be selected as the candidate partition for the nodes in the first partition based on a probability relating to the gain in edge locality.

In an embodiment, the histograms for the nodes in the first partition may indicate a number of connected nodes in each of a plurality of partitions.

In an embodiment, a difference between a number of nodes in the first partition remapped to the second partition and a number of nodes in the second partition remapped to the first partition may be within a threshold.

In an embodiment, a difference between a weight of nodes in the first partition remapped to the second partition and a weight of nodes in the second partition remapped to the first partition may be within a threshold.

In an embodiment, a first total node weight of the first partition may be computed before the remapping.

In an embodiment, a second total node weight of the first partition may be computed after the remapping.

In an embodiment, the computer system may be a non-distributed system. A node graph may be loaded into memory. The node graph may include the nodes in the first partition and the nodes in the second partition In an embodiment, the computer system may be a distributed system. Different portions of a node graph may be loaded across the distributed system. The node graph may include the nodes in the first partition and the nodes in the second partition.

In an embodiment, current partition IDs of connected nodes associated with each of the nodes in the first partition may be received.

In an embodiment, the histograms for the nodes in the first partition are computed based on the current partition IDs.

In an embodiment, a current partition ID of each of the nodes in the first partition may be provided.

In an embodiment, candidate partitions may be selected based on a locality gain threshold.

In an embodiment, the second partition may be selected as the candidate partition for the nodes in the first partition based on a probability relating to a gain in edge locality.

In an embodiment, a record of all partition pairs for a plurality of partitions that indicates nodes to be remapped may be generated.

In an embodiment, the node graph may be supported by a social networking system.

Many other features and embodiments of the invention will be apparent from the accompanying drawings and from the following detailed description.

Figure 1:
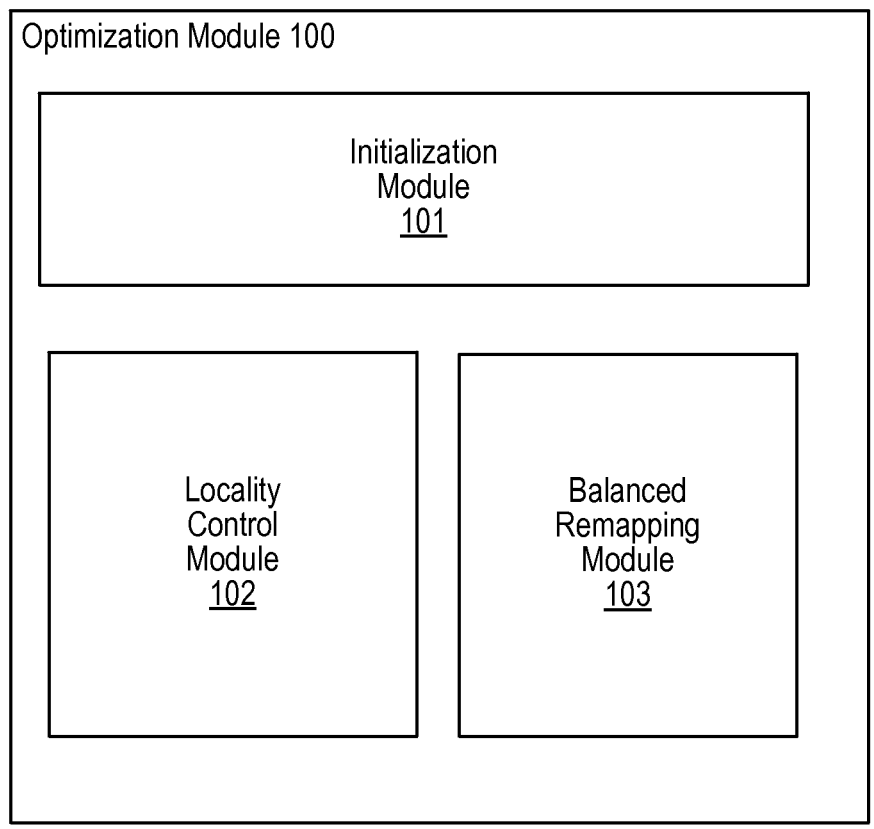
FIG. 1 illustrates an example optimization module 100, according to an embodiment.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

A node graph may be partitioned across multiple elements (e.g., computers) in distributed system. How nodes are mapped to partitions may affect performance. For example, in a social network, having friends (e.g., nodes that are connected by an edge based on "friendship") mapped to the same partition may increase performance by minimizing the fanout of queries to partitions when a friend related query is initiated. A partition may include, for example, servers or a data center. Furthermore, network performance may be increased since friends tend to query duplicative information, in which case there is an increased chance that the duplicative information has already been retrieved for a query and stored within faster memory, such as cache. Therefore, increasing edge locality may be beneficial.

System performance may also be affected by the load on partitions. It is generally beneficial to performance to maintain a balanced load between partitions. The type of "load" may vary based on application. For example, for some application, the load may be based on the number of nodes (e.g., users) within a partition. In other applications, the load may be based on the amount of data that is stored within a partition. In yet other application, the load may be based on the activity level. The activity level may relate to the activity of users in the partition. The activity may relate to the number of times a user performs one or more activities; the amount of data the user uploads, downloads, or both; etc.

In some instances, nodes may be mapped to partitions in a generally random manner, which is likely to result in a low edge locality. For example, users of a social network may be mapped to a partition based on the time they join the network and the partition available at the time. In such case, users of a social network may be mapped to a partition without any consideration of where their friends are mapped.

In some instances, an initial mapping of the node graph may be generated in an attempt to provide a higher edge locality while providing balanced loads between partitions. An example initial mapping may be based on geographic location, for instance, to attempt to generate a higher edge locality while providing balanced loads between partitions. However, node graphs, such as social graphs, are dynamic and are often changing, which may detrimentally affect edge locality or balance. For example, users of a social network may gain or lose friends, may move to different geographic locations, may join new organizations, companies, schools, etc. Furthermore, new users may join the network and form new friendships with existing users, which may also detrimentally affect edge locality or balance. Still further, users may change their behavior or habits which may change the amount of load that they provide to the partition in which they are mapped. While some initial mapping schemes may be beneficial at the time of creation, they are static and may not account for a changing node graph.

Embodiments of the systems and methods described herein relate to optimizing a mapping of nodes of a node graph to partitions to improve edge locality (or connection locality) while maintaining load balance within the partitions. The optimization process may comprise a series of iterations that continually improve edge locality within partitions while still maintaining load balance. For example, in certain embodiments, the optimization process may determine which nodes would benefit edge locality if remapped to a different partition. A candidate partition may be selected for each node that results in a benefit from being remapped to the candidate partition. The optimization process may then selectively move nodes to candidate partition in a manner that maintains load balance. The optimization process may then perform a series of subsequent iterations until the optimization process stabilizes.

Furthermore, the optimization process may be repeatedly performed in the future to optimize the mapping to account for any changes in the node graph that have occurred over time. In an embodiment, the optimization process may be rerun after a predetermined time interval, such as after 1 week, 1 month, 6 months, or any other time interval.

When the node graph changes over time, discrepancies (or destabilizing effects) to the stabilized mapping may be generated since the changes may be detrimental to edge locality or balance. The optimization process may primarily focuses on these discrepancies, since the remaining stabilized portions of the mapping are already stabilized. By doing so, the optimization process may continually optimize a current mapping without having to generate an entirely new mapping each time from scratch. For example, new users tend not to have friendship connection and may be initially mapped to a random partition with minimal or no consideration for edge locality. A future optimization process may focus on the particular reasons for the changes to the stabilized mapping.

FIG. 1 illustrates an example optimization module 100, according to an embodiment. The optimization module 100 optimizes a mapping of nodes of a node graph to partitions in a manner that improves edge locality (or connection locality) while maintaining load balance over the partitions. In an embodiment, the nodes and edges described herein may relate to users and their friendships of a social networking system. The underlying concepts and principles may also be applicable to other types of nodes and edges. In an embodiment, the nodes may be associated with, for example, persons, non-persons, organizations, content (e.g., images, video, audio, etc.), events, web pages, communications, objects, concepts, or any other thing, notion, or construct, whether concrete or abstract, that can be represented as a node. The nodes may include users of a networking system, such as a social networking system. Users may not necessarily be limited to persons, and may include other non-person entities. Edge locality may relate to the number or percentage of edges that are within a partition, as opposed to edges between two partitions. With respect to a given partition, edge locality may relate to the number of edges that are contained within the given partition versus the number of edges that connect to a different partition. With respect to a given node, edge locality may relate to the number of edges connected to the given node and within the given node's partition versus the number of edges connecting the given node to a different partition. The optimization module 100 may include an initialization module 101, a locality control module 102, and a balanced remapping module 103. The components shown in this figure and all figures herein are exemplary only, and other implementations may include additional, fewer, or different components. Some components may not be shown so as not to obscure relevant details.

The initialization module 101 may acquire a current mapping (e.g., initial mapping or random mapping) of nodes of the node graph to partitions. The initialization module 101 may load the node graph into memory. The initialization module 101 may also load node weights or edge weights into memory. Node weight may relate to the amount of load that a user puts on a partition. For example, the node weight for a user in a social networking system may relate to how many times the user logs in, uploads photos, etc. Edge weights may relate to the "cost" of having two nodes on different partitions. For example, two users that share large quantities of data between one another may be determined to have a high edge weight. A tie strength (or coefficient) of an edge may relate to the closeness or relatedness of two nodes. For instance, two users may be family and thus have a larger tie strength than to general acquaintances. In some instances, the tie strength may serve as the edge weight.

The initialization module 101 may also load an initial mapping of the nodes to partitions. For example, the initial mapping may include an initial mapping of nodes to partitions based on a geographic association of the nodes. In the absence of an initial mapping, nodes may be distributed randomly among partitions, resulting in a random mapping. $_{[AP1]}$ The initial mapping or random mapping may then be optimized as discussed herein to improve locality while maintaining load balance.

In one embodiment, a non-distributed system optimizes the mapping. For example, the node graph may be loaded into memory (e.g., RAM) of a single or local machine (or other non-distributed system) that may compute an optimized mapping of the nodes to partitions.

In another embodiment, a distributed system including a plurality of computers may optimize the mapping. For example, the node graph may be loaded across multiple computers (or machines) so that each computer loads a unique subset of the node graph. The node graph may be included within a table from a distributed file system such as a Hadoop Distributed File System (HDFS), for example. Node weights, edge weights, and an initial mapping may be included within additional tables from the distributed file system.

The locality control module 102 performs computations and analysis related to improving edge locality within the partitions, as described in more detail herein. The balanced remapping module 103 performs computations and analysis related to remapping nodes to different partitions in a manner that maintains load balance across the partitions, as described in more detail herein.

Figure 2:
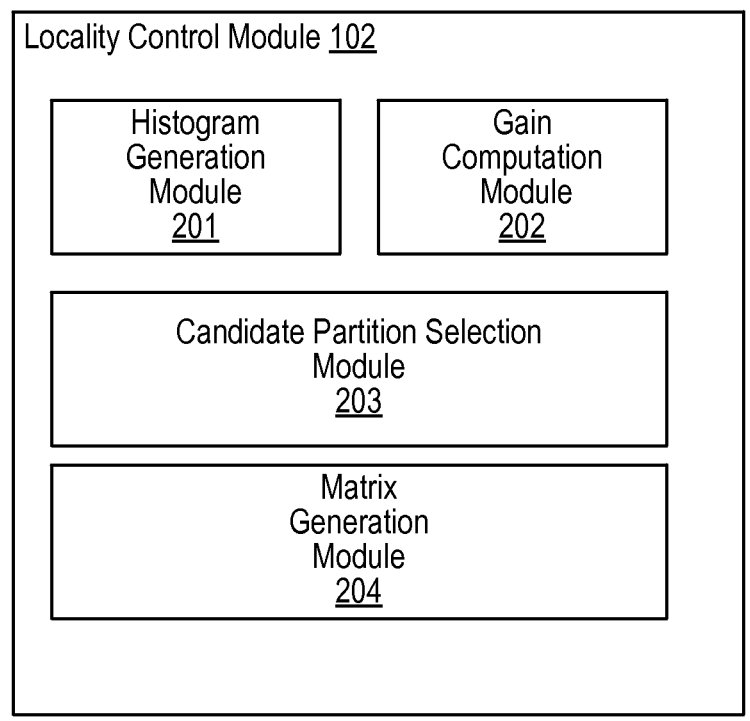
FIG. 2 illustrates an example locality control module 102, according to an embodiment.

FIG. 2 illustrates an example locality control module 102, according to an embodiment. The locality control module 102 may include a histogram generation module 201, a gain computation module 202, a candidate partition selection module 203, and a matrix generation module 204.

The histogram generation module 201 may compute a histogram for the nodes in one or more partitions. The number of nodes that are connected to a given node by an edge (or that have a connection with the given node) may be referred to herein as "connected nodes". In an embodiment where edge weights are not taken into account, the histogram of a given node may identify the number of connected nodes within each partition over a multitude of partitions. In an embodiment where edge weights are taken into account, a given node's histogram may identify the total weight of edges that are connected to each partition over a multitude of partitions.

In an embodiment where a non-distributed system optimizes the mapping, the histogram for each node may be computed by the non-distributed system (e.g., a single computer). For example, a single computer may contain the data to identify each node's current partition, as well as the connected nodes for each node. In this way, the computer may access the data to generate the histogram for each node.

In an embodiment where a distributed system optimizes the mapping, multiple computers may be used to generate the histograms for the nodes in the node graph by communicating information (or messages) between computers. For example, each node may communicate its current partition (e.g., via a current partition ID) to each of its connected nodes. Each node may then identify the partition to which each connected node is mapped, and then generate its own histogram. In an embodiment where edge weights are taken into consideration, edge weights may also be communicated between nodes. The current partitions and node weights may be aggregated globally in a table to identify the total weight of nodes within each partition, as discussed in further detail herein.

The gain computation module 202 may compute a "gain" value associated with remapping of a node from a current partition to a different partition. A given node's "gain" may be computed by the difference between the number of connected nodes mapped to the different partition and the number of connected nodes mapped to the given node's current partition. For example, if a given node is assigned to partition #1, with 5 connected nodes mapped to partition #1 and 7 connected nodes mapped to partition #2, then the given node may have a gain of "2" (i.e., 7–5) if remapped to partition #2. The gain associated with remapping to a different partition may be positive, reflecting an increase in the number of connected nodes within the same partition as the given node and thus increasing the given node's edge locality. The gain associated with remapping to a different partition may be negative, reflecting a decrease in the number of connected nodes within the same partition as the given node and thus decreasing the given node's edge locality. In some instances, the gain may be 0, reflecting no change in the number of connected nodes within the same partition as the given node.

In an embodiment where edge weight is taken into consideration, a given node's gain associated with remapping to a different partition may be computed by the difference between the total edge weights for connected nodes mapped to the different partition and the total edge weights for connected nodes mapped to the given node's current partition.

The candidate partition selection module 203 may select a candidate partition to which a node is to be remapped. The selection of a candidate partition for a given node may be selected based on improving the given node's edge locality. In some instances, a candidate partition that maintains the same edge locality (e.g., results in a gain of 0) may also be selected for a given node.

In an embodiment, the candidate partition for a given node may be selected based a probability relating to a gain in edge locality for the given node. Selection based on a probability algorithm may be beneficial in some instances, such as to avoid problems associated with local optima. A candidate partition for a given node may be selected based on a probability algorithm having a bias towards partitions resulting in greater increases in edge locality. In this way, partitions resulting in greater gains for the given node will have a higher probability, but not necessarily certainty, of being selected as the candidate partition for the given node. For example, node C may be mapped to partition #3 and have 5 connected nodes within partition #3, 10 connected nodes within partition #6, and 8 connected nodes within partition #12, and no connected nodes in any other partition. In one embodiment, the probability algorithm may be defined based on the number of connected nodes within a partition, as well as the total number of connected nodes within partitions that result in a gain. For example, the probability of partition #3 being selected as the candidate partition may be 5/23, where "5" is the number of connected nodes within partition #3 and "23" is the total number of connected nodes (5 from partition #3, 10 from partition #6 and 8 from partition #12). The probability of partition #6 being selected as the candidate partition may be 10/23. The probability of partition #12 being selected as the candidate partition may be 8/23. In an embodiment, partitions resulting in a gain of 0 may also be considered for being a candidate partition. In such, for example, the probability algorithm may be defined based on the number of connected nodes within a partition, as well as the total number of connected nodes within partitions that result in a positive gain or a 0 gain. It should be appreciated that in some embodiments, the relation between the edges within a partition and probability may not be linear. For example, in an embodiment, a "temperature" parameter may regulate the level or degree of bias towards higher gains. In some instances, the temperature parameter may be adjusted across iterations.

In another embodiment, the partition resulting in the greatest increase in edge locality may be selected as the candidate partition.

In an embodiment, a locality gain threshold may be implemented that requires a partition to result in a gain that meets or exceeds the threshold in order to qualify as a candidate partition. For example, if the locality gain threshold is 3, then partitions where a remapping of a given node will result in a gain of 1 or 2 will not qualify to be selected as a candidate partitions. However, partitions where a remapping of a given node will result in a gain of 3 or more will qualify to be selected as a candidate partitions. A locality gain threshold may be implemented, for instance, to reduce or eliminate remappings between partitions with minimal gains.

In an embodiment, the locality gain threshold may vary in different iterations of the optimization. For example, the locality gain threshold may start with a high value and decay across iterations. Other variation patterns for the value of the threshold may also be implemented. In some instances, a high locality gain threshold may be set to stop or slow down remapping of nodes, for long durations or for short durations. In an embodiment where a distributed system optimizes the mapping, the locality gain threshold may start high and decay across iterations. In this way, more useful remapping of nodes may occur first, and then gradually decrease as the partitioning improves and stabilizes to provide a more fine-tuned remapping.

The matrix generation module 204 generates a matrix of node listings based on nodes for every partition pair (X,Y). In an embodiment where a non-distributed system optimizes the mapping, a listing for a partition pair (X,Y) lists the nodes within partition X that have a candidate partition in partition Y. For example, for a partition pair (1,2), all nodes within partition #1 that have a candidate partition of partition #2 may be listed. For a partition pair (1,3), all nodes within partition #1 that have a candidate partition of partition #3 may be listed. For partition pair (3,1), all nodes within partition #3 that have a candidate partition of partition #1 may be listed. The listings for every partition pair (X,Y) may then be generated based on this data. In an embodiment, listings may also indicate the gain associated with the node being remapped to the candidate partition. In an embodiment where node weights are taken into account, a listing for partition pair (X,Y) may include the total weight of the nodes within partition X that have a candidate partition of partition Y.

In an embodiment where a distributed system optimizes the mapping, the listings in the matrix may include values representing the gain from remapping from partition X to partition Y. In an embodiment where node weights are taken into account, then the listings may include the total node weight difference between the neighbors of the node in partition X and partition Y. In an embodiment, a machine associated with each node may communicate its current partition and node weight to machines associated with other nodes in other partitions. In this way, the node weights may be aggregated globally to reflect the total node weights for each partition. The total node weights of partitions may be reflected in a table.

The listings generated by the matrix generation module 204 may then be provided to the balanced remapping module 103 to remap nodes to different partitions. The remapping may be performed in a manner to increase edge locality while maintaining load balance for the partitions, as discussed in further detail herein.

The structure of a non-distributed system may differ from the structure of a distributed system. For example, in an embodiment where a non-distributed system optimizes the mapping, the histogram generation module 201, the gain computation module 202, the candidate partition selection module 203, and the matrix generation module 204 may be implemented in a single computer system and the data associated with the optimization process may be maintained within a single or shared memory (e.g., RAM) for the computer system. In a distributed system, the gain computation module 202, the candidate partition selection module 203, and the matrix generation module 204 may each be implemented across one or more computer systems of the distributed system.

Figure 3:
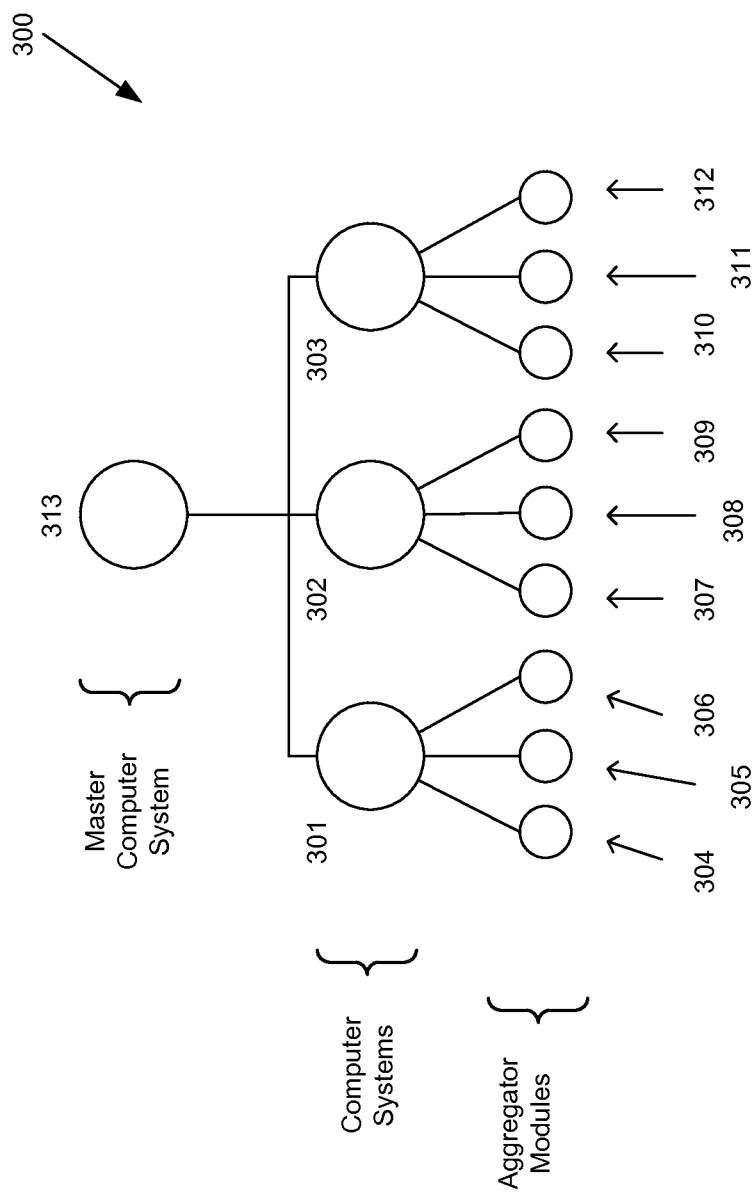
FIG. 3 illustrates an example distributed system, according to an embodiment.

FIG. 3 illustrates an example distributed system, according to an embodiment. The distributed system 300 may include computer systems 301 through 303, aggregator modules 304 through 312, and a master computer system 313.

The node graph may be loaded across the computer systems 301 through 303 such that each of the computer systems 301 through 303 includes a unique subset of the node graph. Three computer systems are used as an example, and it should be appreciated that any other number of computer systems may be implemented in other embodiments.

Each of the computer systems 301 through 303 may also include a subset of the aggregator modules 304 through 312. Each of the aggregator modules 304 through 312 may generate a node listing for one or more partition pairs (X,Y) that may be used to generate the matrix of node listings and partition pairs (X,Y). In an embodiment, each of the aggregator modules 304 through 312 may generate a listing for one of the partition pairs (X,Y). Each of the aggregator modules 304 through 312 may include the histogram generation module 201, the gain computation module 202, and the candidate partition selection module 203, for instance. While nine aggregator modules 304 through 312 are used as an example, it should be appreciated that other numbers of aggregator modules may be implemented in other embodiments. It should also be appreciated that the number of aggregator modules per computer system may vary.

Each of the computer systems 301 through 303 may receive the node listings from its respective subset of the aggregator modules 303 through 312. Each of the computer systems 301 through 303 may then communicate the respective listings to one another and to the master computer system 313. For example, computer system 301 may communicate the listings generated from aggregator modules 304 through 306 to computer systems 302 and 303 and to master computer system 313. The computer systems 301 through 303 and the master computer system 312 may then generate the entire matrix for all partition pairs (X,Y). In this way, the matrix generation module 204 may be implemented by the aggregator modules 304 through 312, the computer systems 301 through 303, and the master computer system 312, for instance. The aggregator modules 304 through 312 may each generate listings for specific partition pairs (X,Y), while the computer systems 301 through 303 and the master computer system 313 may generate the entire matrix of partition pairs (X,Y). In an embodiment, the master computer system 313 need not include any subset of the node graph, but generates the matrix of node listings and partition pairs (X,Y).

Figure 4:
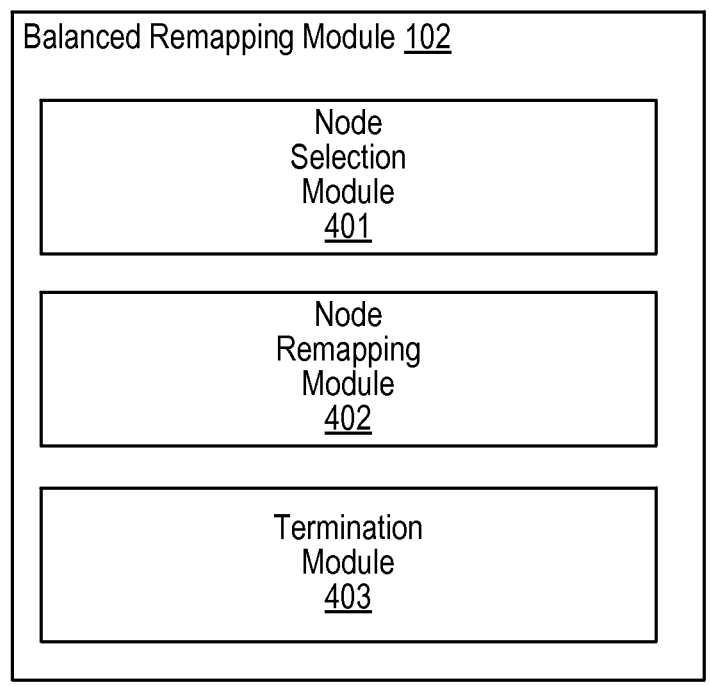
FIG. 4 illustrates an example balanced remapping module 103, according to an embodiment.

FIG. 4 illustrates an example balanced remapping module 103, according to an embodiment. The balanced remapping module 103 may include a node selection module 401, a node remapping module 402, and a termination module 403.

The node selection module 401 may determine, for any given two partitions, which nodes from a first partition may be remapped to a second partition so as to increase edge locality while maintaining load balance across the partitions. The node remapping module 402 remaps the nodes between any given two partitions as determined by the node selection module 401.

In an embodiment where the node weights are not taken into account, the total number of nodes remapped from a first partition to a second partition may equal the total number of nodes remapped from the second partition to the first partition. In another embodiment, the total number of nodes remapped from a first partition to a second partition may not equal the total number of nodes remapped from the second partition to the first partition, but may be within an acceptable tolerance range for maintaining load balance across the partitions. In an embodiment where the node weights are taken into account, the total weight of nodes remapped from a first partition to a second partition may equal the total weight of nodes remapped from the second partition to the first partition. In another embodiment, the total weight of nodes remapped from a first partition to a second partition may not equal the total weight of nodes remapped from the second partition to the first partition, but may be within an acceptable tolerance range for being considered load balanced.

The node selection module 401 may base the remapping determinations on the generated listings for the partition pairs (X,Y). In an embodiment, in order to maintain balance, the number of nodes selected to be moved from partition X to partition Y may be equal to the number of nodes selected to be moved from partition Y to partition X. If listings for two partition pairs (e.g., partition pair (1,2) and partition pair (2,1)) have different number of nodes, then in one embodiment, the number of nodes selected to be remapped from each partition may equal the number of nodes within the listing for the partition pair having the smaller number of nodes. For example, if the listing for partition pair (1,2) include 5 nodes in partition #1 that have a candidate partition of partition #2, and the listing for partition pair (2,1) includes 10 nodes in partition #2 that have a candidate partition of partition #1, then 5 nodes may be selected to be remapped from each partition. For instance, all 5 nodes in the listing for partition pair (1,2) may be remapped to partition #2, and the 5 nodes with the highest gain from the listing for partition pair (2,1) may be remapped to partition #1.

In an embodiment where a non-distributed system optimizes the mapping, the node selection module 401 may include a sorting module that sorts the listings for partition pairs (X,Y) by gain. For example, nodes in partition X that have a candidate partition of partition Y will be ranked based on the gain that each node will have if remapped to the candidate partition. In this way, nodes having the highest gain are selected first for remapping.

In an embodiment where node weight is taken into account, the total weight of the nodes within any two listings of the partition pairs may be computed in order to determine whether nodes may be remapped between the two partitions. For example, if the computed total weight of nodes in partition #3 is greater than the total weight of nodes in partition #4, and there are nodes in the listing for partition pair (3,4), then the nodes in the listing for partition pair (3,4) may be remapped to partition #4. The total weight of the nodes within the two partitions may be recomputed based on the updated remapping between the nodes in partitions #3 and #4, and the analysis repeated. If the computed total weight of nodes in partition #3 is less than or equal to the total weight of nodes in partition #4, and there are nodes in the listing for partition pair (4,3), then the nodes in the listing for partition pair (4,3) may be remapped to partition #3. The total weight of the nodes within the two partitions may be recomputed based on the updated remapping, and the analysis repeated. The comparison of total node weights for partitions and related remapping when the node weights are not equal may be repeated for any suitable number of iterations. When the total node weights for each listing of partition pairs is equal or when their difference is within a selected threshold, then the analysis may be terminated and the partitions may be considered load balanced. In an embodiment, the total weight of the nodes within the partitions may be recomputed based on not only the updated remapping between the nodes in partitions #3 and #4 but also any other updated remappings of nodes between other partitions and either or both of partition #3 and partition #4. In general, the principles described herein related to remapping nodes for load balancing may apply to every pairing of all partitions associated with nodes in the node graph.

In an embodiment where a distributed system optimizes the mapping, the master computer system 313 may generate the matrix of node listings and partition pairs (X,Y) in order to determine how many nodes should be remapped to different partitions. For example, the master computer system 313 may receive the listings for all partition pairs (X,Y) from the aggregators 304 through 312. The listings may identify the total number of nodes in partition X having a candidate partition of partition Y. If node weights are taken into account, then the listing may identify the total weight of the nodes in partition X that have a candidate partition of partition Y.

The master computer system 313 may then determine how many nodes should be remapped to different partitions in order to maintain balance. The master computer system 313 may then communicate the number of nodes that are to be remapped to the computer systems 301 through 303. In an embodiment, in order to maintain balance, if the listings for two partition pairs (e.g., partition pair (1,2) and partition pair (2,1)) have different numbers of nodes, then the number of nodes selected to be remapped from each partition will equal the number of nodes within the listings for the partition pair having the smaller number of nodes.

In an embodiment, the master computer system 313 may compute a move probability for each partition pair and communicate the move probabilities to the computer systems 301 through 303. In an embodiment, the move probability, $P_{XY}$, of remapping nodes in the listing of partition pair (X,Y) may be determined based on the following equation:

$$P_{XY}=Z_{XY}/m_{XY}$$

where $Z_{XY}$ represents the number of nodes that are remapped from partition X to partition Y, and where $m_{XY}$ represents the total number of nodes in partition X having a candidate partition of partition Y.

Each node in partition X having a candidate partition of partition Y has a probability of $P_{XY}$ of being remapped to partition Y.

The termination module 403 may perform computations or analysis to determine when the optimization process should be stopped. In an embodiment, the termination module 403 may stop the optimization process after the optimization has stabilized. In an embodiment where a distributed system optimizes the mapping, the termination module 403 may be implemented by the master computer system 313. The termination module 403 may perform a convergence detection technique to determine if the optimization process has converged so that the optimization process may be stopped. In an embodiment, the termination module 403 may stop the optimization process after a predetermined number of iterations.

In one embodiment, the termination module 403 may stop the optimization process based on a "locality percentage", which may identify the total number or weight of local edges (or edges within a partition versus across partitions) versus the total number of edges in the node graph. The total number of edges may be computed in the beginning of the optimization process, for example. The termination module 403 may receive global statistics about the node graph and optimization of the node graph from the aggregators 304 through 312 to determine locality percentage. Each node in a partition may contribute to the determination of a locality percentage based on whether its edges are local (within the same partition as the node). The weight of the local edges may be aggregated by the aggregators 301 through 303 to determine the total edge weight that is local.

The locality percentage may be based on other considerations. The locality percentage may also be applicable to the total weight of edges, as opposed to the total number of edges. The termination module 403 may base the locality percentage on the ratio of the total weight that is local to a partition versus the total weight of nodes in the node graph. In an embodiment, a determination of locality percentage may consider both the total number of local edges in a partition as well as the total weight of weight of edges in the partition.

Once the locality percentage is stable for a predetermined number of iterations, then the optimization process may be considered to have converged and may be stopped. In an embodiment, such stability may be reflected in changes to the value of the locality percentage that fall within a selected threshold range over a selected number of iterations.

Figure 5:
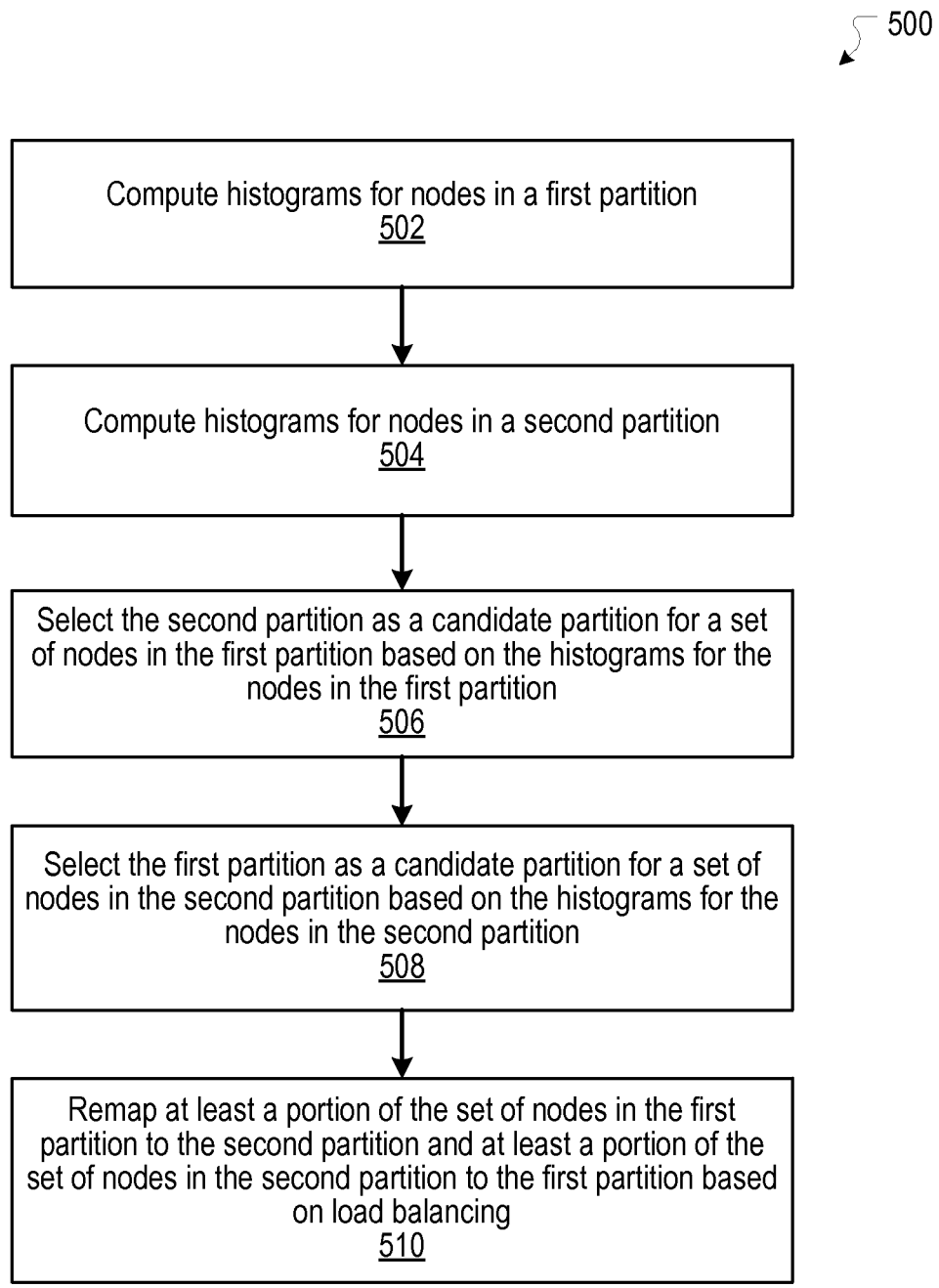
FIG. 5 illustrates an example optimization process for remapping nodes, according to an embodiment.

FIG. 5 illustrates an example optimization method 500 for remapping nodes, according to an embodiment. It should be appreciated that the discussion above for FIGS. 1-4 may also apply to the method of FIG. 5. For the sake of brevity and clarity, every feature and function applicable to FIG. 5 is not repeated here.

At block 502 of method 500, the histograms for nodes in a first partition may be computed. At block 504, histograms for nodes in a second partition may be computed. In an embodiment, blocks 502 and 504 may be performed by the histogram generation module 201 of FIG. 2. In an embodiment where a distributed system optimizes the mapping, each node generates the histogram based on information communicated from machines associated with connected nodes.

At block 506, the second partition may be selected as a candidate partition for a set of nodes in the first partition based on the histograms for the nodes in the first partition. At block 508, the first partition may be selected as a candidate partition for a set of nodes in the second partition based on the histograms for the nodes in the second partition. In an embodiment, blocks 506 and 508 may be performed by the candidate partition selection module 203 of FIG. 2. The candidate partition may be selected based on improving edge locality. In an embodiment, the candidate partition may be selected based on a probability relating to a gain in edge locality. For example, a candidate partition may be selected based on a probability algorithm having a bias towards partitions resulting in greater increases edge locality. In an embodiment, a locality gain threshold may be implemented that requires a partition to result in a gain that meets or exceeds the threshold in order to qualify as a candidate partition. The selection of candidate partitions for the nodes in a partition may involve one, many, or all partitions associated with nodes in the node graph.

At block 510, at least a portion of the set of nodes in the first partition may be remapped to the second partition and at least a portion of the set of nodes in the second partition may be remapped to the first partition based on load balancing in the partitions. Further, the remapping of nodes for load balancing may apply to some or all pairings of all partitions associated with nodes in the node graph. In an embodiment, block 510 may be performed by the balanced remapping module 102 of FIG. 4. In an embodiment where the node weights are not taken into account, the total number of nodes remapped from one partition may equal the total number of nodes remapped from the other partition. In an embodiment where the node weights are taken into account, the total weight of nodes remapped from one partition may equal the total weight of nodes remapped from the other partition. In an embodiment where a non-distributed system optimizes the mapping, the nodes may be remapped based on gain, such that nodes associated with the highest gain will be selected first for remapping. In an embodiment, the remapping of the nodes may be based on the weight of the nodes. In an embodiment where a distributed system optimizes the mapping, a master computer system may determine the number of nodes that should be remapped to each partition in order to maintain balance, and then communicate the number to the computer systems in which the partitions reside to carry out the remapping.

Social Networking System—Example Implementation

Figure 6:
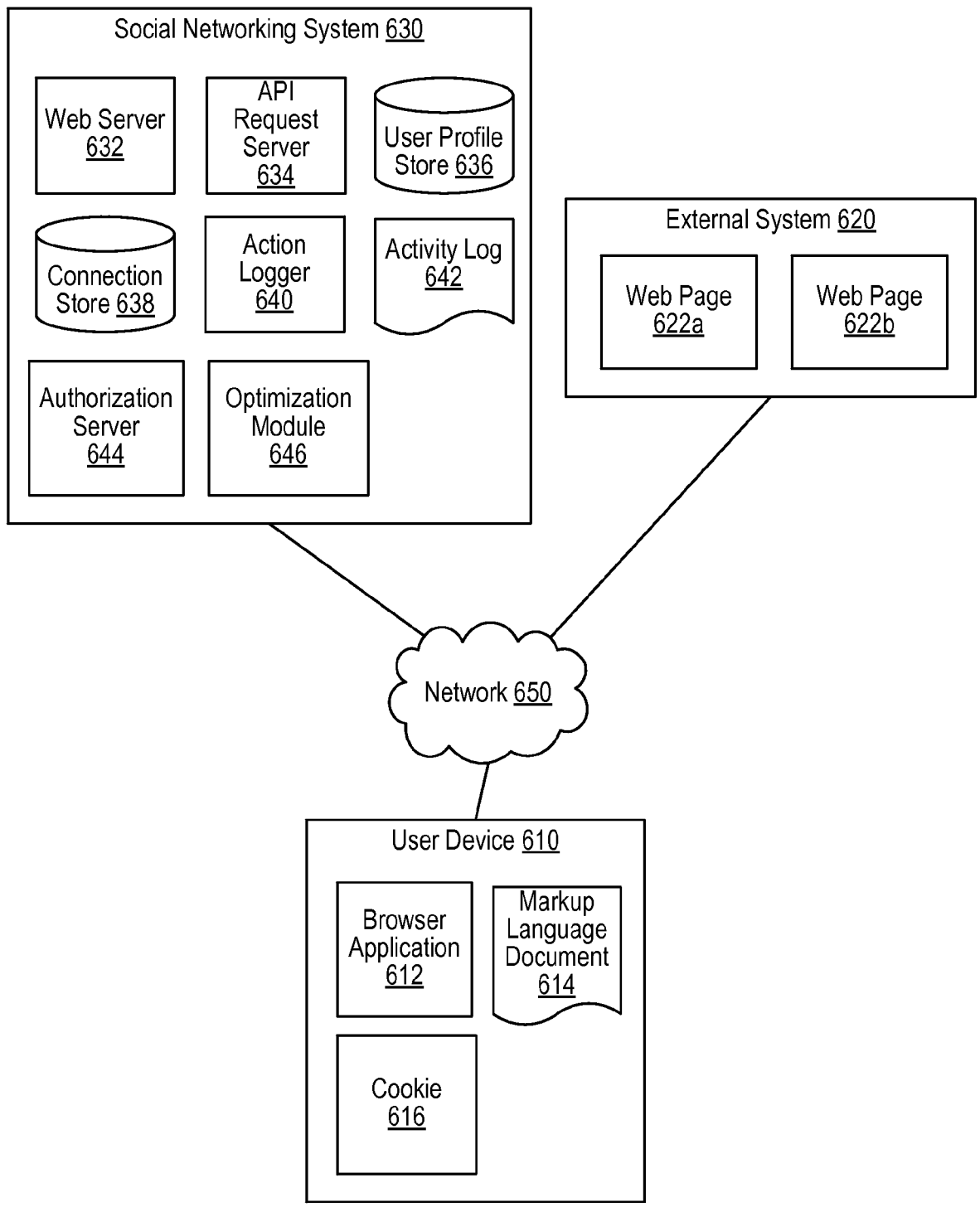
FIG. 6 illustrates an example network diagram of a system for optimizing the mapping of nodes within a social networking system, according to an embodiment.

FIG. 6 is a network diagram of an example system 600 for substituting video links within a social network in accordance with an embodiment of the invention. The system 600 includes one or more user devices 610, one or more external systems 620, a social networking system 630, and a network 650. In an embodiment, the social networking system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, an authorization server 644, and an optimization module 646. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

The optimization module 646 may optimize a current mapping of the nodes of the social graph for the social networking system 630. The optimization module 646 may optimize the current mapping in a manner that improves edge locality while maintaining load balance. In an embodiment, the optimization module 646 may be implemented as the optimization module 100 of FIG. 1.

Hardware Implementation

Figure 7:
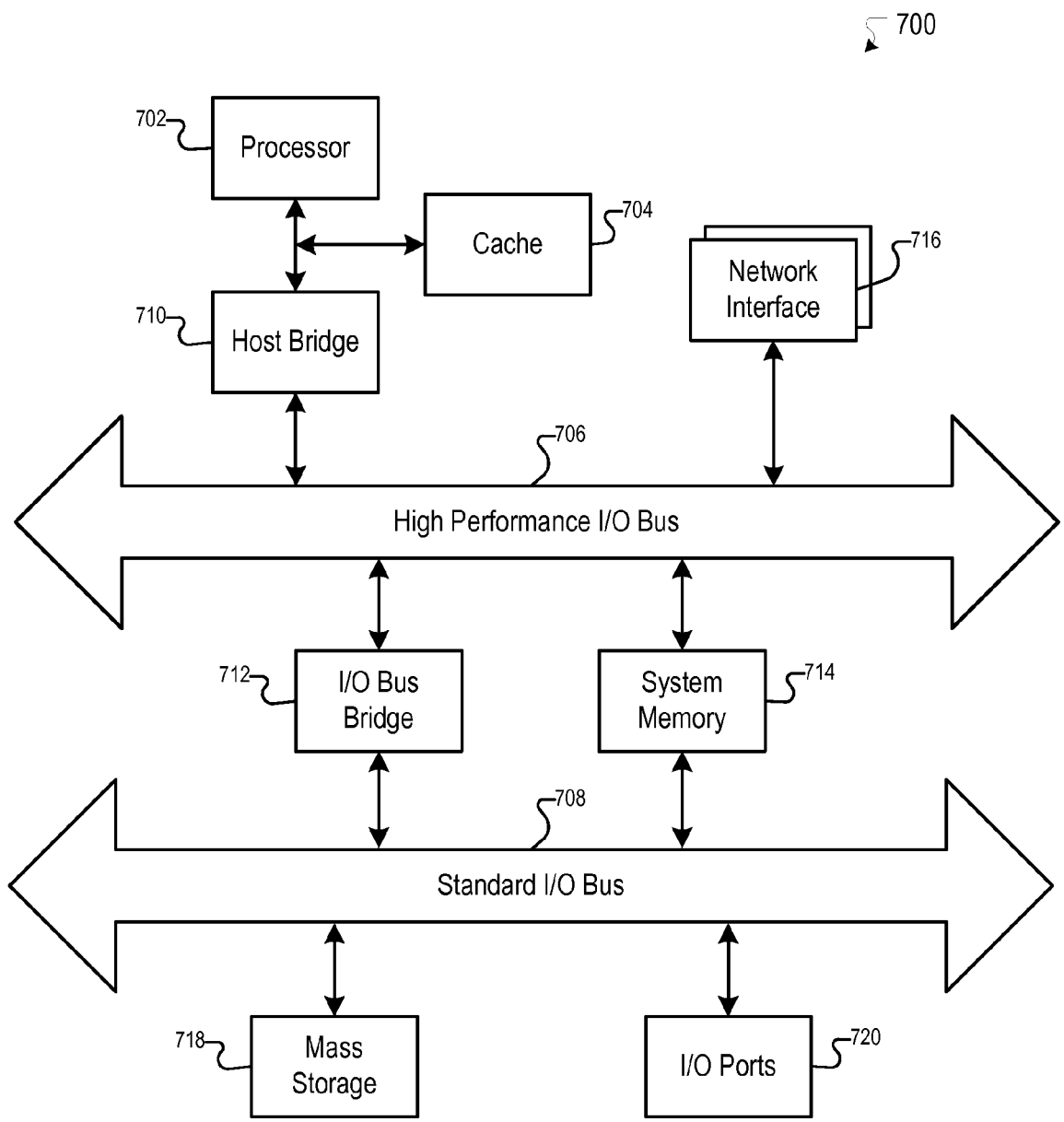
FIG. 7 illustrates an example computer system that may be used to implement one or more of the embodiments described herein, according to an embodiment.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be a component of the social networking system described herein. In an embodiment of the invention, the computer system 700 may be one server among many that constitutes all or part of the social networking system 730.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
computing, with a computer system, a respective histogram for each node in a first partition, wherein the histogram for a node in the first partition indicates, for each partition in a set of partitions, a corresponding total weight of edges of the node that are connected to the partition;
computing, with the computer system, a respective histogram for each node in a second partition, wherein the histogram for a node in the second partition indicates, for each partition in the set of partitions, a corresponding total weight of edges of the node that are connected to the partition;

selecting, with the computer system, the second partition as a candidate partition for a set of nodes in the first partition based on the histograms for the nodes in the first partition and on a probability algorithm relating to a gain in edge locality, the probability algorithm being defined based on a total number of connected nodes within a partition and a total number of connected nodes within partitions that result in a gain;

selecting, with the computer system, the first partition as a candidate partition for a set of nodes in the second partition based on the histograms for the nodes in the second partition;

determining, by the computer system, that remapping (i) at least a portion of the set of nodes in the first partition to the second partition and (ii) at least a portion of the set of nodes in the second partition to the first partition results in both the first partition and the second partition satisfying a threshold load balance, wherein at least some of the nodes in the set correspond to users of the social networking system, and wherein the load for a partition is measured based at least in part on an amount of data transferred by users mapped to the partition; and remapping, with the computer system, at least the portion of the set of nodes in the first partition to the second partition and at least the portion of the set of nodes in the second partition to the first partition.

2. The computer implemented method of claim 1, further comprising:
computing, with the computer system, histograms for nodes in a third partition;
selecting, with the computer system, the third partition as a candidate partition for another set of nodes in the first partition based on the histograms for the nodes in the first partition;
selecting, with the computer system, the first partition as a candidate partition for a set of nodes in the third based on the histograms for the nodes in the third partition; and
remapping, with the computer system, at least a portion of the other set of nodes in the first partition to the third partition and at least a portion of the set of nodes in the third partition to the first partition based on load balancing.

3. The computer implemented method of claim 1, further comprising:
sorting, with the computer system, the set of nodes in the first partition based on a gain in edge locality; and
sorting, with the computer system, the set of nodes in the second partition based on a gain in edge locality.

4. The computer implemented method of claim 1, wherein a difference between a number of nodes in the first partition remapped to the second partition and a number of nodes in the second partition remapped to the first partition is within a threshold.

5. The computer implemented method of claim 1, wherein a difference between a weight of nodes in the first partition remapped to the second partition and a weight of nodes in the second partition remapped to the first partition is within a threshold.

6. The computer implemented method of claim 1, further comprising:
computing, with the computer system, a first total node weight of the first partition before the remapping.

7. The computer implemented method of claim 6, further comprising:
computing, with the computer system, a second total node weight of the first partition after the remapping.

8. The computer implemented method of claim 1, wherein the computer system is a non-distributed system, the method further comprising:
loading, with the computer system, a node graph into memory, wherein the node graph comprises the nodes in the first partition and the nodes in the second partition.

9. The computer implemented method of claim 1, wherein the computer system is a distributed system, the method further comprising:
loading, with the computer system, different portions of a node graph across the distributed system, wherein the node graph comprises the nodes in the first partition and the nodes in the second partition.

10. The computer implemented method of claim 9, further comprising receiving current partition IDs of connected nodes associated with each of the nodes in the first partition.

11. The computer implemented method of claim 10, wherein the histograms for the nodes in the first partition are computed based on the current partition IDs.

12. The computer implemented method of claim 11, further comprising providing a current partition ID of each of the nodes in the first partition.

13. The computer implemented method of claim 12, wherein candidate partitions are selected based on a locality gain threshold.

14. The computer implemented method of claim 9, further comprising:
generating, with the computer system, a record of all partition pairs for a plurality of partitions that indicates nodes to be remapped.

15. The computer implemented method of claim 1, wherein the node graph is supported by a social networking system.

16. A system comprising:
at least one processor, and
a memory storing instructions configured to instruct the at least one processor to perform:
computing a respective histogram for each node in a first partition, wherein the histogram for a node in the first partition indicates, for each partition in a set of partitions, a corresponding total weight of edges of the node that are connected to the partition;
computing a respective histogram for each node in a second partition, wherein the histogram for a node in the second partition indicates, for each partition in the set of partitions, a corresponding total weight of edges of the node that are connected to the partition;
selecting the second partition as a candidate partition for a set of nodes in the first partition based on the histograms for the nodes in the first partition and on a probability algorithm relating to a gain in edge locality, the probability algorithm being defined based on a total number of connected nodes within a partition and a total number of connected nodes within partitions that result in a gain;
selecting the first partition as a candidate partition for a set of nodes in the second partition based on the histograms for the nodes in the second partition;
determining that remapping (i) at least a portion of the set of nodes in the first partition to the second partition and (ii) at least a portion of the set of nodes in the second partition to the first partition results in both the first partition and the second partition satisfying a threshold load balance, wherein at least some of the nodes in the set correspond to users of the social networking system, and wherein the load for a partition is measured based at least in part on an amount of data transferred by users mapped to the partition; and remapping at least the portion of the set of nodes in the first partition to the second partition and at least the portion of the set of nodes in the second partition to the first partition.

17. A non-transitory computer storage medium storing computer-executable instructions that, when executed, cause a computer system to perform computer-implemented method comprising:

computing a respective histogram for each node in a first partition, wherein the histogram for a node in the first partition indicates, for each partition in a set of partitions, a corresponding total weight of edges of the node that are connected to the partition;

computing a respective histogram for each node in a second partition, wherein the histogram for a node in the second partition indicates, for each partition in the set of partitions, a corresponding total weight of edges of the node that are connected to the partition;

selecting the second partition as a candidate partition for a set of nodes in the first partition based on the histograms for the nodes in the first partition and on a probability algorithm relating to a gain in edge locality, the probability algorithm being defined based on a total number of connected nodes within a partition and a total number of connected nodes within partitions that result in a gain;

selecting the first partition as a candidate partition for a set of nodes in the second partition based on the histograms for the nodes in the second partition;

determining that remapping (i) at least a portion of the set of nodes in the first partition to the second partition and (ii) at least a portion of the set of nodes in the second partition to the first partition results in both the first partition and the second partition satisfying a threshold load balance, wherein at least some of the nodes in the set correspond to users of the social networking system, and wherein the load for a partition is measured based at least in part on an amount of data transferred by users mapped to the partition; and remapping at least the portion of the set of nodes in the first partition to the second partition and at least the portion of the set of nodes in the second partition to the first partition.

* * * * *